July 9, 1946.    R. N. LESNICK    2,403,605
SPEED AND ACCELERATION RESPONSIVE DEVICE
Filed July 1, 1942
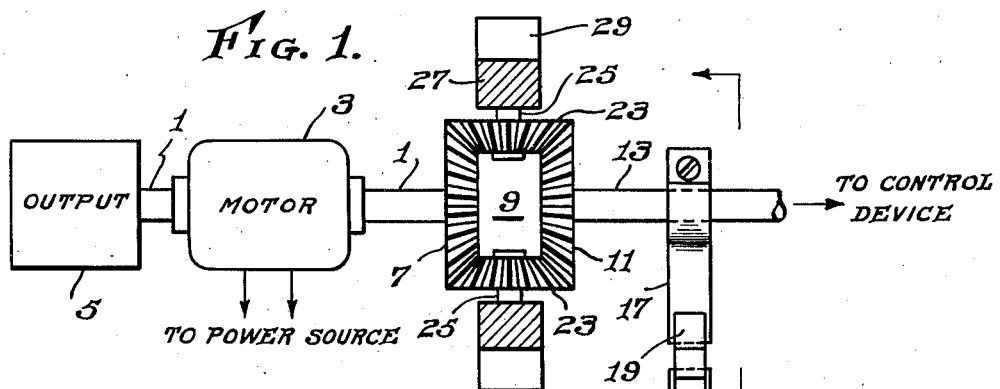
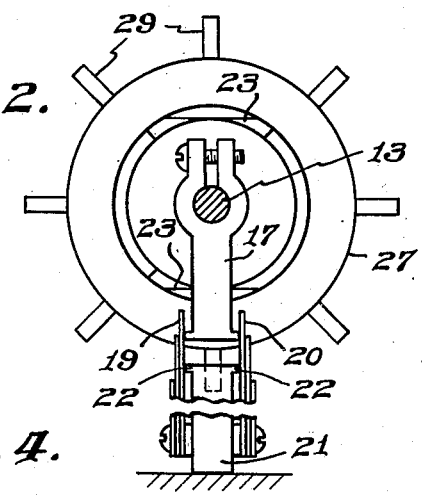
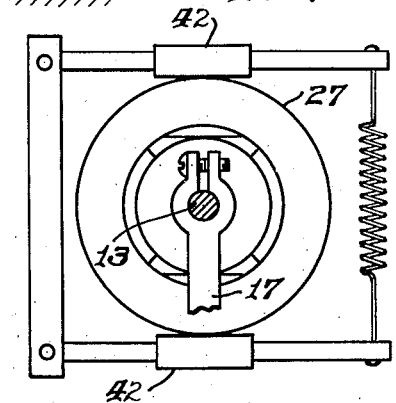
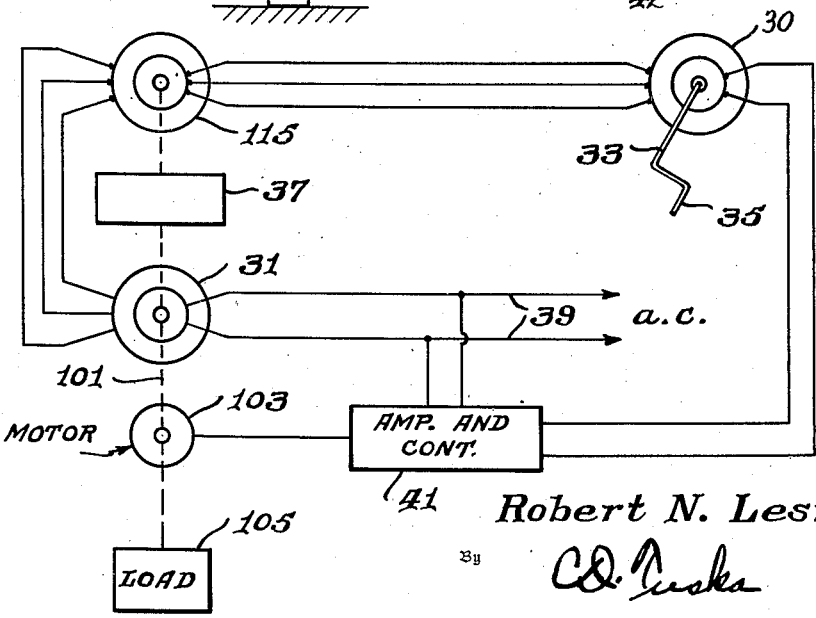
Inventor
Robert N. Lesnick
By CD. Tuska
Attorney Patented July 9, 1946

2,403,605

UNITED STATES PATENT OFFICE 2,403,605

SPEED AND ACCELERATION RESPONSIVE DEVICE

Robert N. Lesnick, Camden, N. J., assignor to Radio Corporation of America, a corporation of Delaware Application July 1, 1942, Serial No. 449,231

3 Claims. (Cl. 172—239)

This invention relates to speed and acceleration responsive devices and more particularly to systems for producing displacement or operation of a control device in response to the speed or acceleration, or both, of a rotating shaft.

Speed and acceleration responsive devices of this type find application in servo systems or follow-up systems such as are used to move a relatively massive object in accordance with the motion of a relatively small control device. In certain cases, it is desirable to add to the effect of the control device an auxiliary factor which is a function of the speed or acceleration of the driven object, in order to compensate lag or hunting of the driven object with respect to the control device.

Accordingly it is an object of this invention to provide an improved method of and means for deriving a displacement component related in magnitude and direction to the angular velocity or acceleration, or both, of a rotatable shaft.

It is a further object to provide an improved means for correcting the errors inherent in certain types of servo systems.

These and other and incidental objects will become apparent to those skilled in the art upon consideration of the following description, with reference to the accompanying drawing, in which Fig. 1 is a side elevation, partly in section, of a speed and acceleration responsive device constructed according to the invention, Fig. 2 is a view through the section 2—2 of Fig. 1, Fig. 3 shows a modified speed-responsive means, and Fig. 4 is a schematic diagram of a servo system embodying the invention.

Referring to Fig. 1, a shaft 1 is driven at any predetermined angular velocity and acceleration by a device 3, which may be an electric motor, in accordance with the operation of controlling means associated with said device. The shaft 1 may be connected with a mechanical load generally designated by the block 5 in the drawing. The shaft 1 is also connected to a gear 7 of a differential 9. A corresponding gear 11 at the other side of the differential 9 is connected through a shaft 13 to a control device (not shown) which responds to movement of the shaft 13 under the forces of springs 19 and inertia forces of the means 27 and 29 to control the application of power to the motor 3. A radial arm 17 is secured to the shaft 13 and extends between two springs 19 and 20 fastened on a fixed support 21 (Fig. 2). In order to determine positively the equilibrium position of the arm 17, even if the characteristics of the two springs are not exactly alike, or vary differently with temperature or age, the springs 19 and 20 may be arranged to bear against stops 22 on the supporting member 21. The spring arrangement illustrated will accommodate angular displacements of the shaft 13 of approximately ten degrees in either direction from the position of static equilibrium. If larger displacements are required, a modified spring structure or suitable gearing may be employed.

The orbit gears 23 of the differential 9 are rotatably mounted on radially extending shafts 25 which are secured to a ring 27. The ring 27 may be of relatively massive construction in order to function as a fly wheel or inertia load, as hereinafter described. Radial vanes 29 may be provided on the surface of the ring 27 to provide a frictional load on the system by air drag, or by similar action in any suitable fluid in which the device may be immersed. The vanes 29 may be omitted and sliding friction means substituted, such as brake shoes 42 bearing in the ring 27, as illustrated in Fig. 3. Another alternative is to provide the ring 27 with a radial flange of conductive material, and produce an eddy current drag related to the speed by means of magnets, as in the well known watt-hour meter construction.

The operation of the device is as follows: Rotation of shaft 1 imparts to the gear 7 an equal motion which is divided by well known differential action between the shaft 13 and the ring 27 inversely as they tend to oppose motion. The motion of the shaft 13 is opposed by one of the springs 19 and 20, and that of the ring 27 is opposed by the inertia force of the ring and the frictional force against the vanes 29. The spring force is a function of the angular displacement of the shaft 13, and the inertia and frictional forces on the ring 27 are functions respectively of the angular acceleration and angular velocity of the ring. Thus the device functions as a yieldable coupling between the shafts 1 and 13 with components responsive to the acceleration and to the velocity of the shaft 1 to rotate the shaft 13 against the spring restraining force.

The shaft 13 will be rotated to an angular position in which the spring force balances the inertia and frictional forces on the ring 27. Hence the position of the shaft 13, and the control device is related to the angular acceleration and the angular velocity of the shaft 1. The exact relations are determined by the moment of inertia of the ring 27, the area and arrangement of the vanes 29 or other frictional means, and the constants of the springs 19 and 20. These factors are all to be considered in the design of the system for any specific application.

Referring to Fig. 4, an electrical servo system embodying the invention is illustrated. A pair of Selsyn type transformers 30 and 31 are mechanically connected to a control shaft 33 and a controlled shaft 101 respectively. The shaft 33 is arranged to be rotated by any desired means such as a manually operable crank 35. The shaft 101 is connected to a driving motor 103 and to a device 37 like the mechanism illustrated in Figs. 1 and 2 of the drawing. The mechanical load to be operated is represented by the block 105, also connected to the driving motor 103.

A Selsyn transformer 115, similar to transformers 30 and 31, is electrically connected between corresponding windings of said transformers; the rotor, for example, of the transformer 115 being connected to the stator of the transformer 30 and the stator of the transformer 115 being connected to the stator of the transformer 31. The stator of the transformer 115 is maintained stationary, and the rotor is connected through a shaft 101, corresponding to the shaft 13 of Fig. 1, to the device 37.

The rotor winding of the transformer 31 is energized with alternating current from supply lines 39. The rotor of the transformer 30 is connected to the signal input circuit of an amplifier and motor control device designated by the block 41. The device 41 is also energized from the lines 39, and is arranged to control the motor in accordance with the amplitude of the control input voltage and its polarity with respect to a voltage derived from the supply lines 39.

The operation of the system of Fig. 4 is as follows. The output voltage of the transformer 30 is amplified in the device 41. If said voltage is zero, the motor 103 is not energized. If the voltage is not zero, the motor 103 is caused to rotate and turn the rotor of the transformer 31, changing the voltages applied to the transformer 115 and through it the voltages at the primary of the transformer 30. The voltage at the secondary of the transformer 30 depends on both the voltages impressed upon its primary, and the physical position of its rotor with respect to its stator. Thus the voltage at the input of the device 41 changes with the rotation of the motor 103 until it is again zero, whereupon the motor 103 stops and the system remains at rest until unbalanced by some outside force such as rotation of the crank 35.

In nearly all systems of this class, certain errors are inherent. For example, a consideration of the principles of operation shows that there must be some difference in the angular positions of the controlling and driven shafts in order to provide a difference in the two voltages compared in the device 41 and operate the motor. Hence the two shafts normally do not remain in positional agreement while the system is in motion. Another and often troublesome effect is that of "hunting," or overrunning and reversal of the driven member about the point of positional agreement with the control shaft. Servo systems of many types, as well as electrical systems, are subject to such difficulties.

It has been found that the above described defects may be partially or substantially eliminated by adding to the control signal or equivalent force a quantity related in magnitude to the velocity and acceleration of the driven member. In the system illustrated in Fig. 3 this is done by displacing the rotor of the transformer 115 by means of the device of Fig. 1 described above. For example with the system initially at rest the crank 35 is rotated through some predetermined angle. Voltage applied to the transformer 31 from the A.-C. lines 39 is converted to three separate in-phase voltages which are applied to the stator of the transformer 115. The amplitudes of these voltages with respect to each other depend upon the angular position of the rotor of the transformer 31. Corresponding voltages are produced in the stator of the transformer 115 and as long as the rotor remains in its initial position with respect to the stator thereof, the output of the transformer 115 corresponds exactly to the output of the transformer 31. This output is applied to the stator of the transformer 30, providing a resultant field through the armature thereof and inducing a voltage in the rotor winding which corresponds in amplitude to the difference in the angular positions of the crank 35 and the output shaft 101. This voltage is amplified by the amplifier 41, causing the motor 103 to rotate toward a position corresponding to that of the crank 35.

As soon as the motor 103 starts to rotate, the input shaft of the device 37 is rotated, causing the output shaft to rotate in the opposite direction due to inertia and friction loading on the differential spider member. This causes the rotor of the transformer 115 to move through an angle which is a predetermined function of the acceleration and velocity of the driving motor 103, altering the relationship between the three voltages in the output circuit of the transformer and hence advancing the angular position of the field in the transformer 30 in a direction opposite to the direction of rotation of the crank 35. This increases the magnitude of the control signal applied to the amplifier 41, providing more energization of the motor 103 and hence a greater torque than would normally be produced as a result of the difference in angular position between the crank and the driving motor. Thus upon starting, the inertia of the load is overcome by increasing the total control signal in response to the acceleration of the output shaft. If rotation of the crank 35 is continued, the output shaft will rapidly assume the velocity of rotation of the crank and as soon as acceleration ceases the rotor of the transformer 115 will tend to assume its initial position under the action of the springs 19 and 20. However the frictional load on the device 37 will continue to provide its original effect, maintaining an advance in the position of the field in the transformer 30 proportional to the velocity of the shaft 101. Thus the magnitude of the control signal is higher at the higher velocities of operation, although not directly proportional to either the displacement or the velocity. Upon retardation of the crank 35 the inertia of the device 37 acts in the opposite direction from that during acceleration, reducing the resultant control signal applied to the amplifier 41 to a value which is less than the normal displacement proportional signal, tending to reduce the energization of the motor more rapidly than the difference between the positions of the crank 35 and the output shaft 101 is reduced. At the same time the frictional load on the device 37 tends to maintain the control signal at a higher level in response to the velocity of rotation of the shaft 101. This component retains its original sense although the acceleration component is reversed. Thus as the output shaft tends to overshoot, reversing the displacement signal, this reversed signal is materially reduced by the velocity component, causing the shaft 101 to rotate to its correct angular position more slowly so as to prevent overshooting in the opposite direction and further reversal.

Thus the invention has been described as an improved speed and/or acceleration responsive device, comprising mass and drag or friction elements driven through a differential having an output shaft restrained by spring means. The spring force is balanced against the inertia and drag or friction forces, resulting in a displacement of the output shaft which is a function of the velocity and acceleration of the input shaft. An illustrative application of this device in an electrical servo system has also been described.

I claim as my invention:

1. In a servo system including a control shaft, a controlled shaft, means for comparing the angular positions of said shafts, means for deriving a force related to the difference in said positions and applying said force to said controlled shaft so as to drive said controlled shaft toward a position corresponding to that of the control shaft, means for deriving auxiliary forces related in magnitude and direction to the velocity and to the acceleration of said controlled shaft comprising differential means connected to said controlled shaft and connected to drive a mechanical load comprising inertia and friction elements against a resilient restraining member, and means for deriving said auxiliary forces in response to the displacement of said restraining member.

2. In a servo system comprising a control shaft, a driven shaft, means responsive to the difference in the angular positions of said shafts to control a motor to drive said driven shaft toward positional agreement with said control shaft, means responsive to the angular velocity and acceleration of said driven shaft to produce an auxiliary control effect on said motor, including a differential connected between said driven shaft and an auxiliary control shaft resiliently restrained against rotation, and a mechanical load connected to said differential to control the transmission of torque from said driven shaft through said differential to said auxiliary control shaft.

3. In a servo system including a driven shaft, a motor coupled to said shaft, and means for energizing said motor in response to a control input signal, angular displacement responsive means for producing an auxiliary signal in addition to said control input signal, differential gearing including two shafts and a spider member, said shafts being connected respectively to said driven shaft and to said displacement responsive means, and a mechanical load comprising friction and inertia elements coupled to said differential spider member to cause rotation of said displacement responsive means as the sum of predetermined functions of the speed and the acceleration of said driven shaft.

ROBERT N. LESNICK.